(12) United States Patent
Mansfield

(10) Patent No.: US 7,535,471 B1
(45) Date of Patent: May 19, 2009

(54) SCALE-ADAPTIVE FONTS AND GRAPHICS

(75) Inventor: Philip Andrew Mansfield, Vancouver (CA)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 11/286,110

(22) Filed: Nov. 23, 2005

(51) Int. Cl.
*G06T 11/00* (2006.01)
(52) U.S. Cl. .................. 345/467; 345/469; 345/472
(58) Field of Classification Search .......... None
See application file for complete search history.

(56) References Cited

U.S. PATENT DOCUMENTS 6,577,314 B1 * 6/2003 Yoshida et al. .............. 345/471
6,766,052 B2 * 7/2004 Okada et al. ................ 382/162
7,012,605 B1 * 3/2006 Manome ..................... 345/469
7,271,806 B2 * 9/2007 Everett ....................... 345/471

* cited by examiner

*Primary Examiner*—Ulka Chauhan
*Assistant Examiner*—Andrew Yang
(74) *Attorney, Agent, or Firm*—Van Pelt, Yi & James LLP

(57) ABSTRACT

Scale-adaptive fonts and graphics are disclosed. In some embodiments, an indication of a desired overall size for the graphic is received. The graphic is scaled to the desired overall size. A shape of the graphic is adapted to the desired overall scale at least in part by adjusting a thickness of at least a portion of the graphic in a manner that preserves one or more stylized features of the shape.

25 Claims, 16 Drawing Sheets

SCALE-ADAPTIVE FONTS AND GRAPHICS

BACKGROUND OF THE INVENTION

The use of vector graphic techniques to define fonts and other graphics has made it possible to scale fonts and other graphics over a range of sizes while maintaining the shape and clarity of the original font or other graphic. Previously, bitmaps were used to define fonts, and for each character or "glyph" a separate bitmap had to be defined for each character size, e.g., for each "point" size, in the case of a font. A bitmap image uses a grid of individual pixels where each pixel can be a different color or shade. Bitmap images require higher resolutions and anti-aliasing for a smooth appearance. Vector graphics use mathematical relationships between points and the paths connecting them to describe an image. In the case of a vector graphic font, the outline of a character is described mathematically. Vector-based graphics appear smooth at any size or resolution.

While vector graphics can be scaled to any desired size while maintaining the original shape and smoothness, in some cases it may be necessary or desirable to change an aspect of the appearance of a glyph at different sizes, e.g., depending on the environment in which the glyph appears. For example, in the case of a font each character typically is a stylized version of a symbol the basic shape of at least some of which is capable of being rendered as a one dimensional line drawing. For glyph in which some portions are thicker than others, for example to give a desired visual effect, scaling the entire glyph uniformly may lead to a relatively thick portion dominating the page, or other adjacent glyphs or images, more than an artist who designed the font, or an author or artist creating a document or other object in which the glyph is used, would have desired.

In certain equation editors, for example, characters of a wide range of sizes may be used within a limited space to display a mathematical expression, such as an integral or summation of a first level fraction that includes additional fractions, superscripts such as exponents, and subscripts in the numerator and/or denominator. If there are lots of layers of fractions within fractions, for example, the scale of the initial integral sign may be quite large so that lower level operators, variables, etc. will be legible. If the font used to portray the equation included an integral glyph that was thicker in the middle than near the ends, for example, the thicker middle part might become quick thick in absolute terms at a very large scale, to the point where it appeared to be out of proportion to the other characters in the equation.

The problem described above can be appreciated by considering that a stylus or quill used to render stylized calligraphic characters manually typically has an inked tip in the shape of a rectangular wedge. Line thickness is varied—in a range between a minimum thickness determined by the width of the tip and a maximum thickness determined by the height (i.e., the length of the longer dimension) of the tip—by changing the orientation of the tip with respect to direction of motion along the page. A calligrapher might make larger scale characters and features more thick than smaller ones, but he/she could not make them any thicker than the maximum line thickness the quill is capable of making.

In the case of a vector graphic font or other vector graphic glyph, for example, each glyph is normally defined as a collection of closed, continuous curves that typically are filled with a solid color, e.g., according to an even-odd fill rule so that the holes are not filled. Any algorithm that adapts glyph shape must preserve the fact that they are closed, continuous curves, and must not fundamentally change the topology of the shape (e.g. the number '8' must have two holes and the letter 'e' must have one hole before and after shape adjustment) or the topology of the boundary (e.g. the number of disjoint closed curves and the number of times each one crosses itself must not change).

One approach used in the past to mitigate this effect is to use a line drawing (e.g., a line of uniform thickness) in place of a stylized glyph created by the designer of the font, but that approach results in the visual effect and distinctiveness of the stylized glyph being lost and typically results in a symbol that seems out of place with the other glyphs in the equation or other text. Also, many graphics, including many font characters, are not stylized versions of simple line drawings, such that no line drawing is available to use as a substitute.

Another context in which this problem of lock-step scaling is present is a map or other information display in which items of a different nature are represented using text, symbols, or lines having different characteristics. For example, in the case of a map typically lines of varying thickness and/or color are used to distinguish between different classes of road, boundaries for different types of political subdivision, etc. A zoom feature might result in thicker lines being scaled up to an incongruous or visually unappealing thickness, such as by filling too much of a viewable area (e.g., a display screen or printed page) and/or obscuring other features. The same could occur with respect to larger text on a map or other documents. For example, a larger label, such as a country name, might upon changing the overall scale (e.g., by zooming in on an area) be scaled an presented in such a size that the thickness of the characters in the label obscure other, smaller labels intended to be visible adjacent to and/or through the larger label, such as the names of states, towns, bodies of water, or other features. Conversely, at times it may be desirable to have a glyph appear relatively thicker at very large scale, while retaining a stylized shape. An example of this is a poster or other document or display desired to be legible at a distance.

There is a need, therefore, for a better way to take advantage of the scalability of vector graphics without having undesirable visual effects and/or while providing desired visual effects not provided by uniform scaling, such as in situations in which graphics of widely different scale appear together in a limited display space.

BRIEF DESCRIPTION OF THE DRAWINGS

Various embodiments of the invention are disclosed in the following detailed description and the accompanying drawings.

DETAILED DESCRIPTION

Figure 1A:
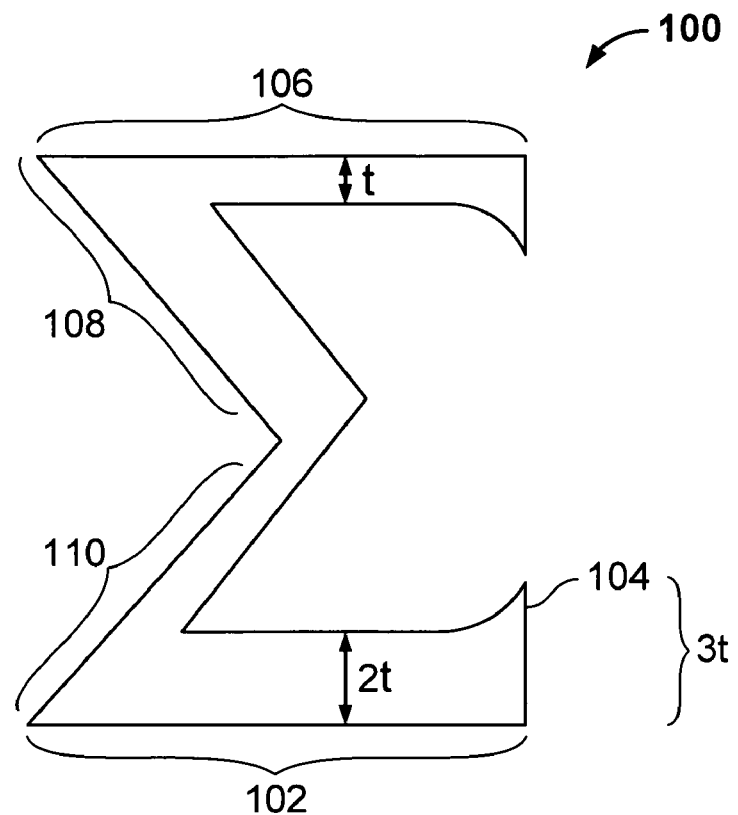
FIG. 1A is an example of a stylized glyph for a capital Greek letter sigma, commonly used in math notation as a summation symbol.

The invention can be implemented in numerous ways, including as a process, an apparatus, a system, a composition of matter, or a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Scale-adaptive fonts and graphics are disclosed. Scale-adaptive vector graphic fonts and other graphics as disclosed can be designed or made to scale more gracefully across a wide range of sizes and in situations in which glyphs of various scales are displayed close together are disclosed. In one embodiment, the definition of a vector graphic font or other glyph includes a definition of a "spine"—in some embodiments the equivalent of a stylized one dimensional line drawing of the glyph—and each point or unit length on the outline of the glyph is mapped to corresponding point on the spine. Glyph line (or other feature) thickness is adjusted as the overall scale of the glyph is varied such that thickness does not necessarily scale by the same factor as overall glyph size. In some embodiments, scaling is accomplished by scaling the glyph by a scaling factor "F" and then increasing or decreasing the distance of each point (or unit length) on the outline from its corresponding point on the spine by a factor different than but determined at least in part by the scaling factor F, such as the square root of F. In some embodiments, if a font or other graphic does not describe a spine, an approximated spine is generated for the glyph and used to adjust glyph line thickness in accordance with glyph scale. In some alternative embodiments, a spine is not used to provide a font or other graphic that scales more gracefully. In some embodiments, as overall glyph scale is increased by a scaling factor "F", at each point or unit length on the outline of the glyph an amount proportional to the scaling factor F is shaved off, such that thickness is increased by a factor that is less than the scaling factor applied to the overall glyph. In yet another approach, each point or unit length on the outline of the glyph is imagined to have an equal and like electrical charge, such that each point repels each other point. The repulsive force at any point is determined mathematically, and when the glyph is scaled thickness at any give point or unit length is determined by calculating the repulsive force at that point (or unit length) and a displacement at that point (or unit length) such that an equal amount of work is done at each point (or unit length).

Figure 1B:
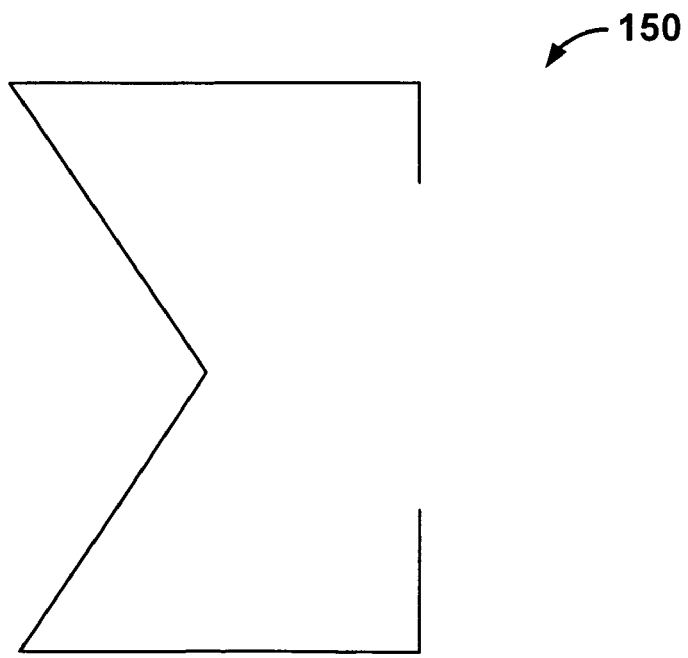
FIG. 1B is a line drawing of the stylized glyph of FIG. 1A.

FIG. 1A is an example of a stylized glyph for a capital Greek letter sigma, commonly used in math notation as a summation symbol. In the example shown, the glyph 100 includes a lower horizontal portion 102 of thickness $2t$ having a lower right edge 104 that flares to a height $3t$, an upper horizontal portion 106 of thickness t, an upper diagonal portion 108 of thickness $2t$, and a lower diagonal portion 110 of thickness t. The glyph 100 illustrates a problem that can arise when glyphs of mixed sizes appear together, such as in a complicated mathematical equation, a map, or otherwise. The summation symbol of glyph 100 for example often sometimes appears at the beginning of a complicated mathematical equation and in such cases must be displayed in a size and manner that makes clear the symbol applies to an entire expression that follows. If the expression that follows includes a fraction, or nested layers of fractions (e.g., one or more second order fractions in the numerator and/or denominator of the first order fraction, and one or more third order fractions in the numerator and/or denominator of one or more second order fractions, etc.), or exponents or other superscripts or subscripts that themselves include mathematical expressions, which expressions may themselves include exponents or other superscripts or subscripts, etc., then glyphs at many different scales will appear in relatively near proximity to each other. If the glyph 100 were, for example, on a scale eight times as large as smaller characters appearing at the lowest size level in a following mathematical expression, and the glyph 100 were scaled in a manner that preserves the exact shape of the outline, as typically has been done, the thicker portions and features of the glyph 100 would be 16 (e.g., portions 102 and 108 of thickness t) or 24 (e.g., flared edge 104 of height $3t$) times as thick as at least thinner portions of smaller glyphs that have a base thickness t. In some cases, features of such great thickness relatively to smaller glyphs may be undesirable, for example by creating an unpleasing visual effect and/or by drawing too much attention to a part of the overall mathematical expression, the summation operator, that depending on the context may not represent the information that is most important to a viewer. One prior art approach to this problem has been to substitute in certain such circumstances a simple line drawing, e.g., one made using one or more solid lines and/or curves of uniform and relatively narrow thickness, such as the line drawing 150 of FIG. 1B. As can be seen from a visual comparison of glyph 100 and line drawing 150, one could scale the drawing 150 to quite a large size and not cause a disproportionate or otherwise undesirable visual effect such as described above. However, this technique results in the distinctive styling of the glyph 100, which in this example is achieved at least in part by having portions and features of the glyph 100 be of different thickness, being lost.

Figure 2A:
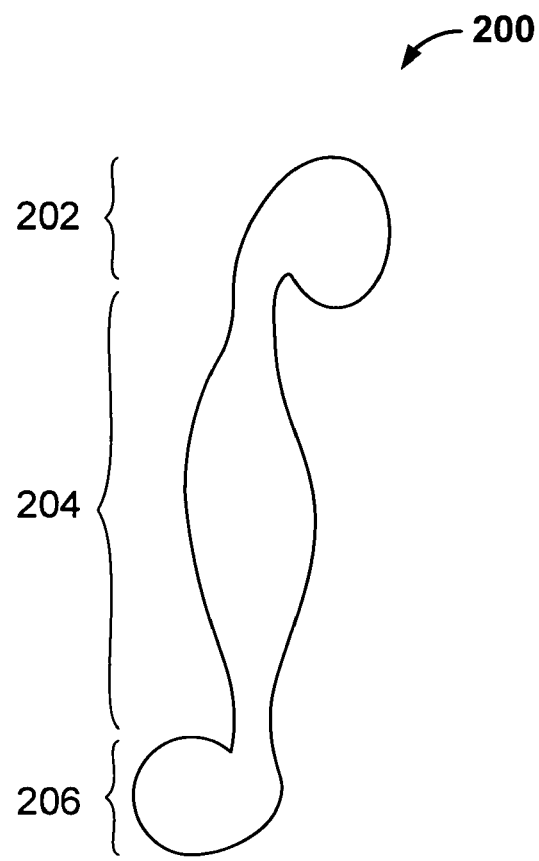
FIG. 2A is a drawing of a stylized version of an integral symbol.
Figure 2B:
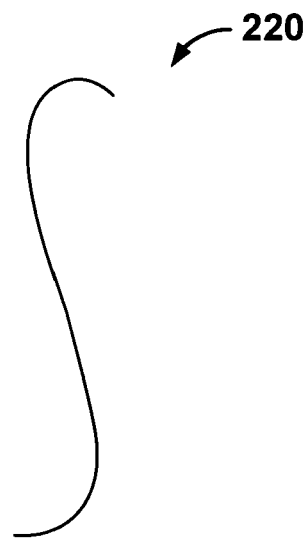
FIG. 2B is a line drawing of the stylized glyph of FIG. 2A.

FIG. 2A is a drawing of a further example of a stylized glyph. In this example, glyph 200 comprises a stylized version of an integral symbol commonly used in integral calculus expressions. The glyph 200 includes a head portion 202, a body portion 204, and a tail portion 206. The body portion 204 is thicker in the middle and tapers to a narrow neck at either end, where it connects to head portion 202 and tail portion 206 respectively. FIG. 2B is a simple line drawing 220 of the glyph 200 of FIG. 2A. As one can see from visual comparison of glyph 200 and line drawing 220, much of the style and character of glyph 200 would be lost if line drawing 220 were used instead of glyph 200 to portray an integral symbol on a scale much larger than other glyphs in a mathematical expression that followed.

In a typical vector graphic font, glyph (character) shapes are described by their outlines. A glyph outline consists of a series of contours. A simple glyph may have only one contour. More complex glyphs can have two or more contours. Composite glyphs can be constructed by combining two or more simpler glyphs. Contours are composed of straight lines and curves. Curves in at least some cases are defined by a series of points that describe second order Bezier splines.

Within the context of planar geometry, a bounded curve is defined as a continuous function $C:[0,1] \to R^2$. The curve C can be expressed in the form $C(t)=(x,y)$ where t is the curve parameter and (x,y) are the coordinates of the corresponding point. A closed curve is defined as a bounded curve C such that $C(0)=C(1)$. A glyph outline is defined as a finite set of closed curves $C_1, C_2, \ldots, C_n$. It is possible to piece these together as a single function $C:[0,1] \to R^2$ where $$C(t) = C_i(nt - i + 1) \text{ for } \frac{i-1}{n} \le t < \frac{i}{n} \text{ and } i = 1 \ldots n$$

Figure 2C:
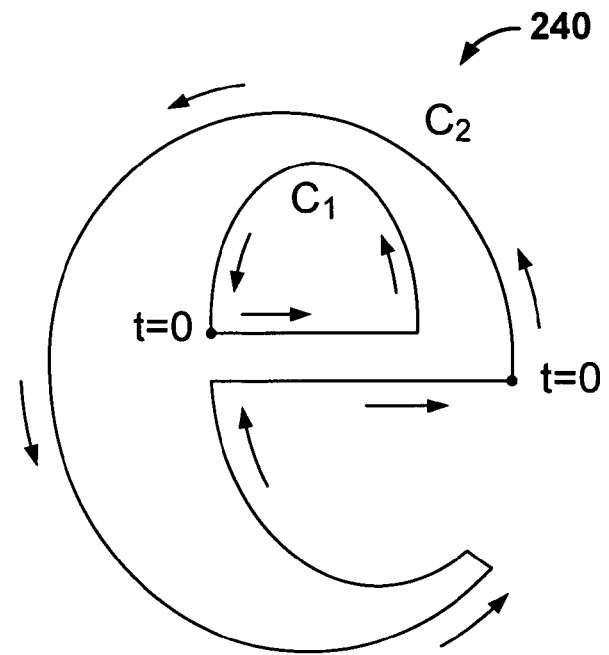
FIG. 2C shows an example of a letter "e" that consists of two closed curves.
Figure 2D:
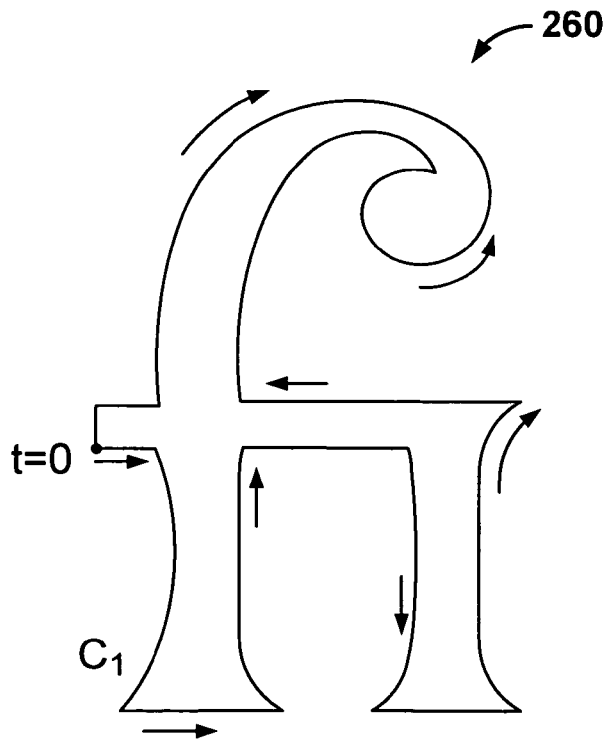
FIG. 2D shows an example of a ligature "fi" that consists of closed curve.

For example, the letter "e" consists of two closed curves, as shown in FIG. 2C, whereas the ligature "fi" consists of a single curve, as shown in FIG. 2D. Examples of a stylized glyph 240 for the letter "e" a stylized glyph 240 for the ligatures "fi" as shown in FIGS. 2C and 2D, respectively, along with an arbitrary choice of direction for increasing t.

Various ways to provide the appearance of thinning or thickening by any desired amount, while keeping overall glyph scale the same, are disclosed. In some application of these techniques, the amount of thinning or thickening can be a function of the scale factor used in a prior or subsequent uniform scaling transformation.

Defining a spine for a glyph and scaling thickness based at least in part on a mapping of points or portions of a glyph outline to the spine is disclosed. In some embodiments, a font definition file includes for each of at least a subset of glyphs a description of a spine. The thickness of a portion of a glyph at various glyph sizes is determined at least in part by scaling a distance between a point or portion of the outline of the glyph associated with the glyph portion for which the thickness is being determined and a corresponding point on and/or portion of the spine.

Figure 3A:
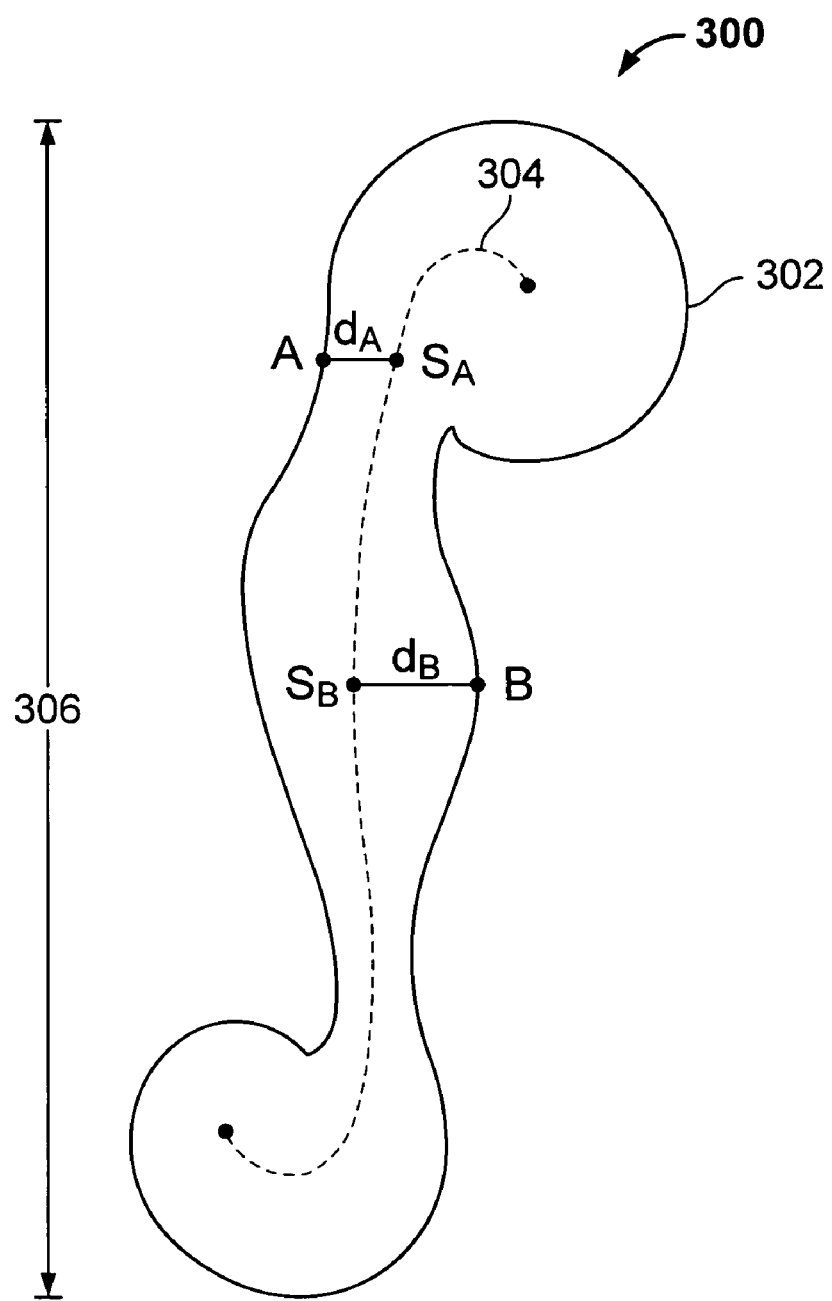
FIG. 3A is a drawing of a scale-adaptive glyph and associated spine as provided in some embodiments.

FIG. 3A is a drawing of a scale-adaptive glyph and associated spine as provided in some embodiments. In the example shown, the glyph 300 comprises a vector-based graphic in the form of a stylized integral symbol. The glyph 300 comprises an outline 302 that defines the outer boundaries and shape of the glyph. A spine 304 is shown. In some embodiments, the spine 304 comprises a set of points, in the example shown a one dimensional curve, that serves as a set of reference points with respect to which distances to corresponding points on outline 302 is computed to determine the respective thickness of respective portions of glyph 300 at various overall glyph scales. In some embodiments, a definition associated with the glyph 300 includes a vector graphic description of a glyph outline 302 and a description, such as a vector graphic description, of spine 304. In some embodiments, the spine 304 is designed by a font designer and/or other artist or graphic design professional who designed the glyph 300, e.g., for inclusion in a font. In some embodiments, a font definition for glyph 300 describes outline 302 but not spine 304, and in some such embodiments a spine 304 for glyph 300 is determined and/or approximated, as described more fully below, e.g., in connection with FIGS. 7B-D.

The spine is intended to capture the notion of a line drawing of which the glyph shape is a stylized version, as if by varying the thickness as the line is drawn. However, in the general case a glyph may look nothing like a line drawing, and appropriate spine definitions can be very effective in general.

In some embodiments, for a glyph or other graphic C the spine is defined as a set of bounded curves $S_1, \ldots, S_m$. A correspondence between points on an outline or border of the glyph C and the associated spine defined for glyph C is defined by a correspondence function as follows:

$$L: C([0,1]) \to \bigcup_{i=1}^{m} S_i([0,1])$$

The correspondence function is interpreted as follows: If $L((x_1,y_1))=(x_2,y_2)$ then the glyph point $(x_1,y_1)$ corresponds to the spine point $(x_2,y_2)$. Since L is a function, every glyph point has a unique corresponding spine point, but not necessarily vice versa.

In some embodiments, thickness is scaled differently than overall glyph size for at least a portion of a glyph. In the example shown in FIG. 3A, a point "A" on outline 302 is mapped to a corresponding point $S_A$ on spine 304 and at the scale shown is at a distance $d_A$ from point $S_A$ on the spine 304. Likewise, a point "B" on outline 302 is mapped to a corresponding point $S_B$ on spine 304 and at the scale shown is at a distance $d_B$ from point $S_B$ on the spine 304. In the example shown, the distance $d_B$ is greater than the distance $d_A$ because the glyph 300 is thicker at point B than at point A.

In some embodiments, the thickness at any point (or region, such as unit length) along the outline is determined at least in part by calculating a value for the distance to that point on (or part of) the outline from a corresponding point on (or portion of) the spine. When the overall glyph size is increased or decreased, e.g., by applying a scaling factor "F" to the overall size, in some embodiments the distance from the spine to the outline at each point on (or portion of) the outline is determined based at least in part by applying to a current or baseline distance a scaling factor determined based at least in part, but not necessarily equal to, the scaling factor F. In some embodiments, if overall scale is increased by a factor F spine-to-outline distances are increased by a factor f(F), where f(F) is defined for all positive F. In some embodiments the glyph outline and spine are first scaled by a factor F and then thickness is adjusted by applying an adjustment factor f(F)/F to the spine-to-outline distances. In various embodiments, the function f(F) has one or more of the following characteristics: f is continuous (apparent thickness varies continuously with scale factor), limit as F→0 of f(F)=0 (scaling the shape to nothing should scale apparent thickness to nothing), f(1)=1 (apparent thickness should not be changed when there is no scaling), f is an increasing function of F (apparent thickness increases as scale factor increases), limit as F→infinity f(F) =infinity (thickness can be made arbitrarily large with increasing F), and in the example of mathematical equations (but not some other use cases), the first derivative of f(F) is a decreasing function of F (apparent thickness increases more slowly as the scale factor increases).

In some embodiments, a scaling factor equal to the square root of F is applied to the spine-to-outline distances. For example, assume in FIG. 3A that at the scale shown the distance $d_A$ is 1 unit and the distance $d_B$ is 2 units. In some embodiments, increasing the overall size of glyph 300 by four times results in a scaling factor equal to the square root of four, i.e., two, being applied to the spine-to-outline distances such as $d_A$ and $d_B$, which in this example would result in those distances being doubled, to 2 units and 4 units respectively, while the overall glyph scale, e.g., glyph height 306, would be quadrupled. If the spine-to-outline distances, and therefore the glyph thickness, had been scaled in lock step with overall glyph size, the distances would have increased four times, resulting in a spine-to-outline distance of 8 units at point B, for example.

The square root function is just one example of a function f(F) that meets the above-noted criteria for a thickness adjustment function. There are many others, such as F raised to any power p in the range 0<p<1, or the logarithm base 2 of (F+1). Furthermore, in non-mathematical use cases, in some embodiments an adjustment function f(F) that has a characteristic somewhat different than the characteristic listed last above is used. For example, if it is desired to make glyphs appear thicker at very large scale, e.g., when making a poster or other document or display desired to be legible at a distance, an adjustment function f(F) having the following characteristic is used: f(F)>F if and only if F>1, but such that asymptotically the limit as F approaches infinity of the first derivative of f(F)=1 (to avoid the extra thickness eventually obliterating the shape). An example of a function that meets the above criteria modified as described in this paragraph is f(F)=(F+2) (1+(4/pi) arctan(F−1))/3.

Figure 3B:
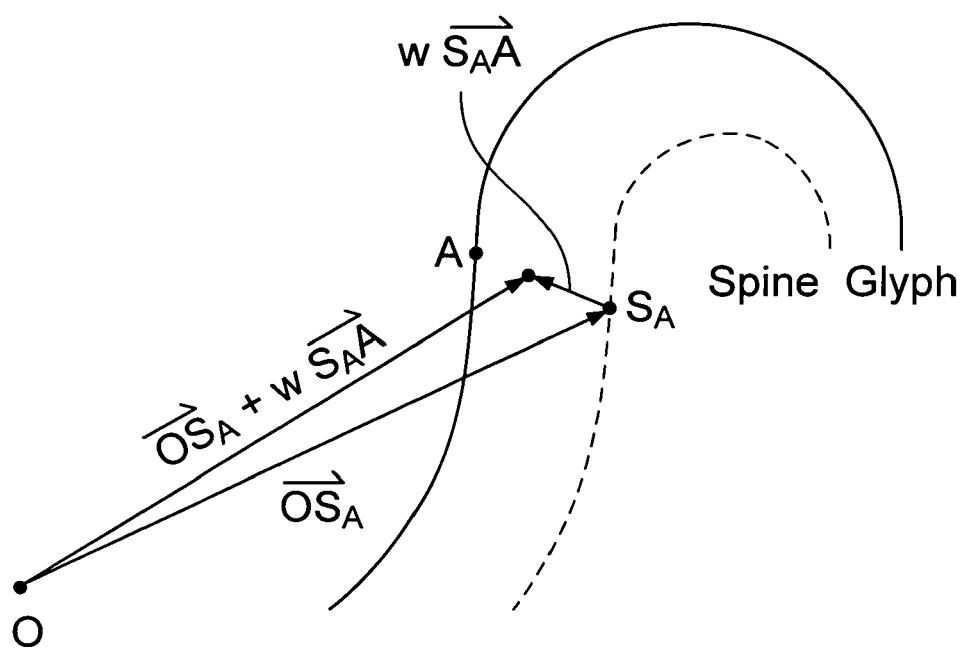
FIG. 3B illustrates adjusting the thickness by applying an adjustment factor to a spine-to-outline vector.

FIG. 3B illustrates adjusting the thickness by applying an adjustment factor to a spine-to-outline vector. If we denote the origin of a plane in which the glyph is to be rendered as "O", a point on the glyph outline as "A", and the point on the spine that corresponds to "A" as "$S_A$", then in some embodiments to scale the apparent thickness of the glyph by a factor W, e.g., to implement an adjustment W=f(F)/F after the overall scale of the glyph has been increased uniformly by a factor F, we move each glyph point from vector position:

$$\vec{OA} = \vec{OS_A} + \vec{S_AA}$$

to vector position:

$$\vec{OA} = \vec{OS_A} + W\vec{S_AA}$$

Each point thus moved inherits the same parameter value as it had originally, so the result is a still collection of parameterized curves.

Unless special care is taken with the spine definitions, it is possible for piecewise discontinuities to arise in the interpolated (i.e., scale-adapted) glyph outline. In some embodiments, to deal with that avoidable case any disjoint segments are joined with a straight-line segment at the parameter values where such a discontinuity occurs.

In some embodiments, spine-to-outline distances are pre-scaled, e.g., thinned if the glyph is to be made larger or made thicker if the glyph is to be made smaller, at a current glyph size and then the pre-thinned glyph is scaled to a desired larger size. In some embodiments, scaling of the overall glyph size and the spine-to-outline distances is performed in a single operation, with the spine-to-outline distances being implemented when the scaled overall glyph is rendered. In some embodiments, the overall glyph and the associated spine are scaled first, resulting in spine-to-outline distances and/or thickness being scaled initially in lock step with the overall glyph size, and then modified spine-to-outline distances are computed and implemented as described above.

In some embodiments, if the overall size of the glyph is being reduced, e.g., by applying a scaling factor F that is less than one, the spine-to-outline distances are scaled by a factor that is greater than F. In some embodiments, a different rule or equation for scaling spine-to-outline distances may be defined and/or applied to different portions of the glyph. In some embodiments, a maximum spine-to-outline distance is defined and the spine-to-outline distance at any given point on a glyph is scaled to a distance that is the lesser of (1) the maximum distance and (2) a computed spine-to-outline distance (e.g., a current or baseline distance multiplied by the square root of a scaling factor F applied to overall glyph size).

In some embodiments, a minimum spine-to-outline distance is defined and the spine-to-outline distance at any given point on a glyph is scaled to a distance that is the greater of (1) the minimum distance and (2) a computed spine-to-outline distance (e.g., a current or baseline distance multiplied by the square root of a scaling factor F applied to overall glyph size). In some embodiments, both a minimum and maximum are defined and a computed spine-to-outline distance is used if it is greater than the minimum and less than the maximum, and if not the minimum or maximum is used, as applicable.

In some embodiments, a scaling factor applied to spline-to-outline distances is determined based at least in part on an environment in which a glyph appears. In some embodiments, the scaling applied to spline-to-outline distances is determined based at least in part on a scale or size of one or more other glyphs or other drawings or objects that appear in a predefined and/or dynamically determined area, e.g., on the same page or within a text, equation, drawing, object, or other defined area. In some embodiments, the scaling applied to spline-to-outline distance is determined based at least in part on a comparison of a first scale or size associated with a smallest (or largest) scale or size glyph or other feature in an area in which a glyph to be scaled appears and a second scale to which a glyph for which spline-to-outline distances are being computed is to be scaled. In some embodiments, scaling spline-to-outline distances based at least in part on an environment in which a glyph appears results in a glyph of a given size or scale potentially being rendered with different spline-to-outline distances, and as a result different line thicknesses, depending on the context in which it appears.

Figure 4:
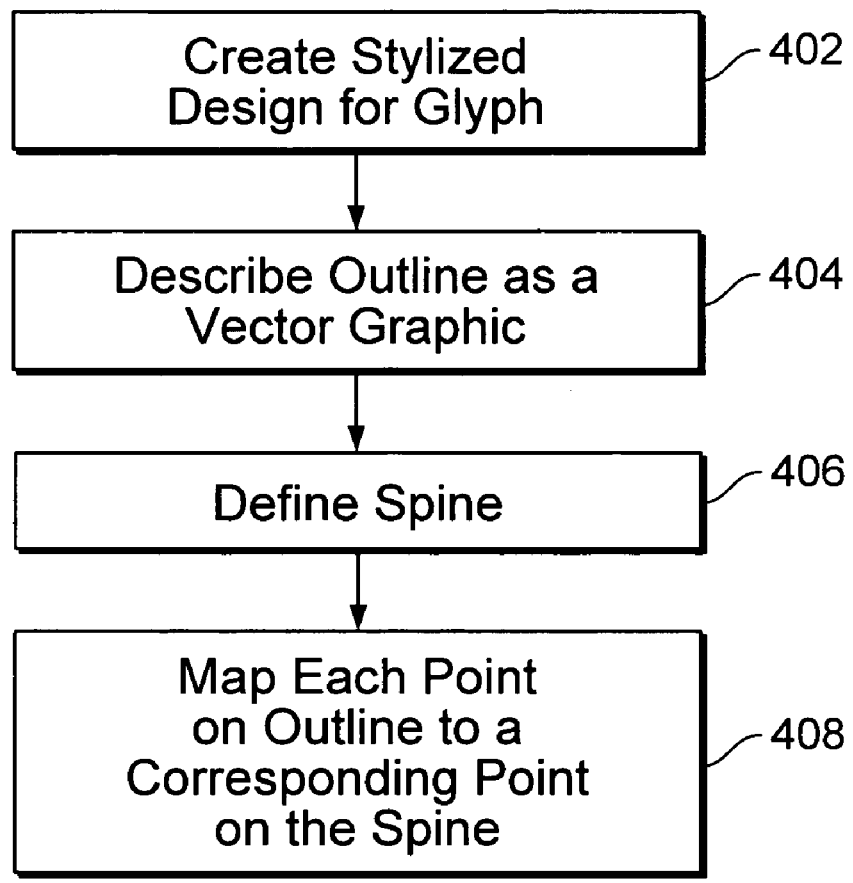
FIG. 4 is a flow chart illustrating an embodiment of a process for defining a glyph.

FIG. 4 is a flow chart illustrating an embodiment of a process for defining a glyph. In some embodiments, the process of FIG. 4 is used to create a glyph definition in a prescribed format for each of a plurality of glyphs comprising a font. At 402, a stylized design for the glyph is created. In various embodiments, an artist or other type or font designer creates an original artwork comprising the glyph, e.g., using a computer-based design or graphics art system and/or application, or tools more traditionally used to design fonts. At 404, the outline of the glyph designed at 402 is described as a vector graphic. In some embodiments, 404 is performed in the same or much the same way as for existing vector graphic fonts, in that the outline is described in terms of one or more points and one or more paths, e.g., lines or curves, between those points. At 406, a spine is defined. In some embodiments, the font or type designer defines the spine. In some embodiments, the font or type designer does not define the spine at the time the font is designed and defined, and the spine is instead generated or approximated at 406 at a later time, e.g., dynamically at a time when the glyph designed at 402 is to be scaled. In some embodiments, the spine is described as a vector or other graphic. In various embodiments, the spine comprises and/or approximates a simple line drawing of the glyph designed at 402. In some embodiments, the spine approximates a longitudinal and/or other geometric center line or point of at least a portion of the glyph designed at 402. At 408, each point (or range of points, e.g., each unit length) on the glyph outline described at 404 is mapped to a corresponding point on the spine. In some embodiments, more than one point on the outline may be mapped to the same point on the spine, e.g., points on opposite sides of the spine or points adjacent an endpoint of the spine, such as points in a base or end portion of the glyph. In some embodiments, each point on the outline is mapped to one and only one point on the spine.

Figure 5:
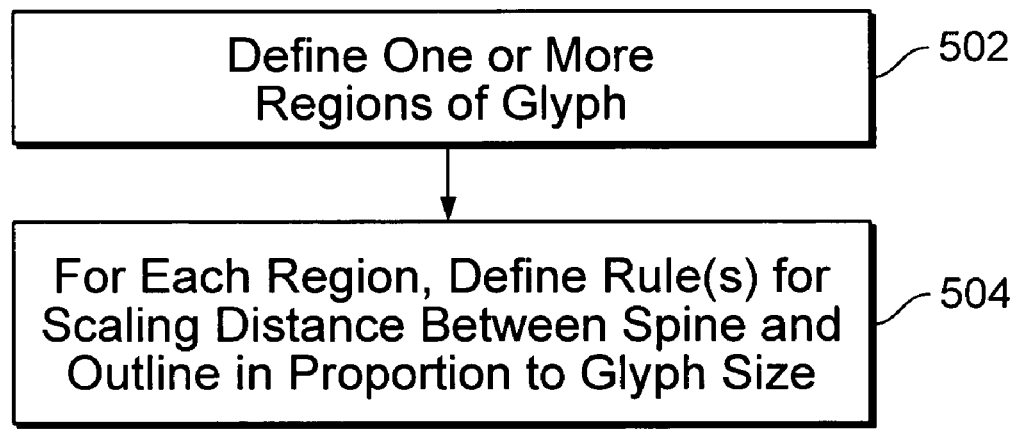
FIG. 5 is a flow chart illustrating an embodiment of a process for defining scaling rules or logic for a glyph.

FIG. 5 is a flow chart illustrating an embodiment of a process for defining scaling rules or logic for a glyph. At 502, one or more regions of the glyph are defined. In some embodiments, the same rule(s) and/or logic is/are applied to all regions of a glyph and 502 is omitted. In some embodiments, defining one or more regions at 502 enables thickness to be scaled differently, in relation to overall glyph size, for different portions. For example, thicker portions and/or ornamental features may be increased/decreased in thickness less in proportion to overall glyph size than other, e.g., relatively smaller and/or thinner portions and/or features. At 504, for each region defined in 502, one or more rules and/or logic is/are defined for scaling the spine-to-outline distances for points in that region, e.g., in proportion to the scale or size of the overall glyph.

Figure 6:
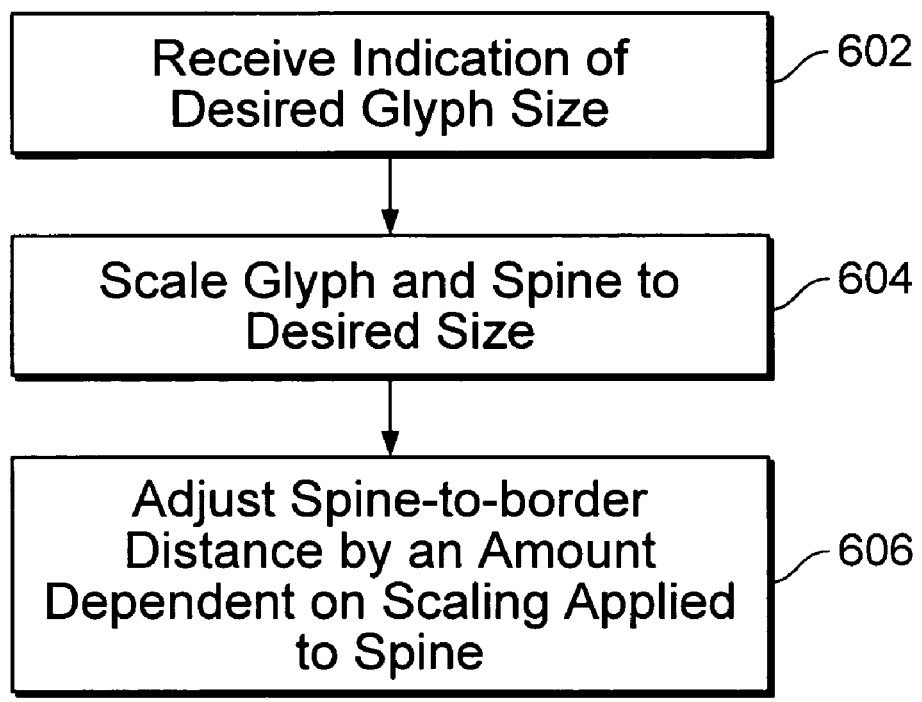
FIG. 6 is a flow chart illustrating an embodiment of a process for scaling a glyph.

FIG. 6 is a flow chart illustrating an embodiment of a process for scaling a glyph. At 602, an indication of a desired overall glyph size is received. Examples of an indication of a desired overall glyph size include an indicated point size, window size, or scaling factor. At 604, a spine associated with the glyph is scaled to the desired size indicated in the indication received at 602. At 606, for each point (or range of points) on the glyph outline, a spine-to-outline distance for the glyph at the desired overall glyph size is determined (e.g., computed) and implemented. In some embodiments, 606 includes applying to a current or baseline spine-to-outline distance a computed spine-to-outline distance adjustment factor determined based at least in part on a scaling factor applied to the spine in 604 and/or determined to be required to achieve the desired overall glyph size indicated at 602. In some embodiments, adjusted or new spine-to-outline distances are computed and implemented by generating a vector graphic description of an outline of the glyph at the size indicated at 602, which outline results in the spine-to-outline distances of the rendered glyph at the desired size being equal to the computed spine-to-outline distances.

Figure 7A:
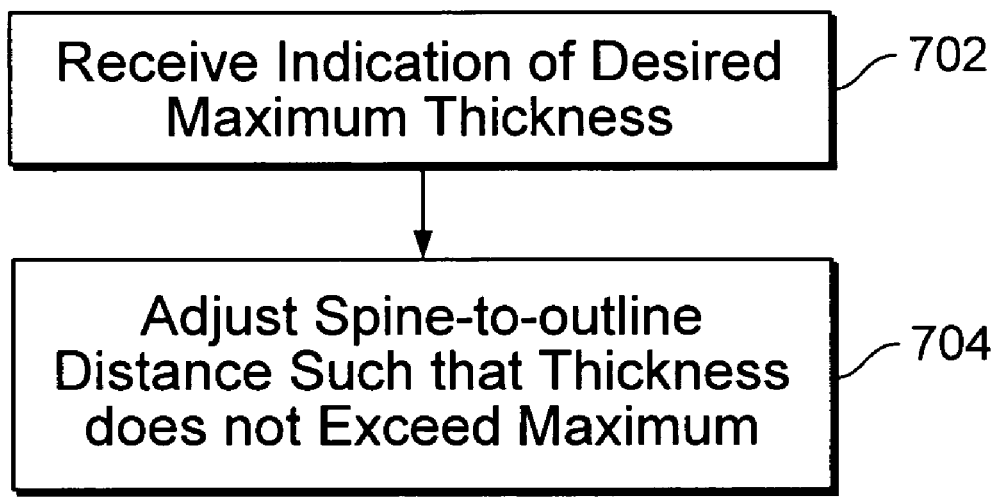
FIG. 7A is a flow chart illustrating an embodiment of a process for enforcing a maximum thickness.

FIG. 7A is a flow chart illustrating an embodiment of a process for enforcing a maximum thickness. In the example shown, at 702 an indication of desired maximum thickness is received. At 704, during scaling of a glyph spine-to-outline distances are adjusted such that the thickness of the scaled glyph does not exceed the maximum. In some embodiments, 704 includes capping the spine-to-outline distance at any point at one half the maximum thickness indicated at 702. In various embodiments, a process similar to the process of FIG. 7A is used to implement a minimum thickness instead of and/or in addition to a maximum thickness.

An advantage of the approach described above is that glyph interpolation can be precisely controlled for optimal appearance. However, additional font information has to be created, e.g., by a designer of the font, and included and/or associated with a definition of the font and/or glyph.

As noted above, when no spine or correspondence function is provided in advance, in some embodiments a spine and correspondence function are computed, enabling the techniques described above to be applied.

In some embodiments, the spine S is determined as the set of all points P such that (i) P lies inside the glyph shape (where "inside" is determined by the even-odd fill rule applied to the se, of all closed curves constituting the glyph), (ii) there exist at least two distinct points $Q_1$, $Q_2$ on the glyph outline such that the lines, $PQ_1$ and $PQ_2$ are both perpendicular to the outline, and equal in length, and (iii) there is no shorter perpendicular form P to a point on the glyph outline.

The above spine definition is not parameterized, but the spine does not have to be parameterized in order to apply the techniques described above.

Computationally, S can be determined by comparing the endpoints of a finite set of inward perpendiculars at each of a finite set of lengths $l_i$, and if two endpoints are close enough, recursively refining the test of their coincidence by subdividing the intervals over which perpendiculars of the given length $l_i$ are constructed in the neighborhood of each of them.

The correspondence function is determined in some embodiments by defining each point on the glyph to correspond to the closest point on the spine that an inward perpendicular intersects. If an inward perpendicular does not intersect the spine at a given parameter t, then the last parameter value at which an intersection occurred is used to determine the corresponding spine point instead.

Figure 7B:
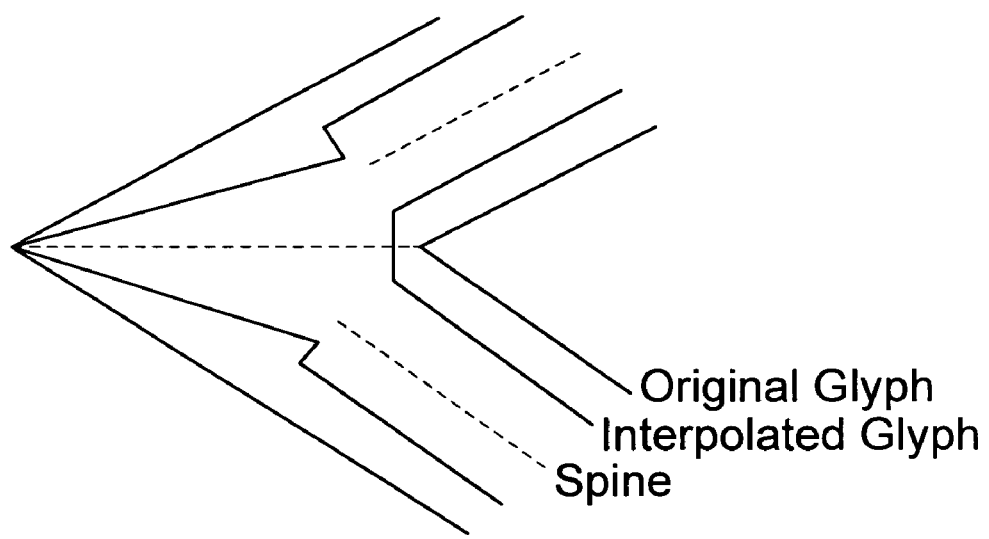
FIG. 7B shows an example of a spine discontinuity occurring at a corner.
Figure 7C:
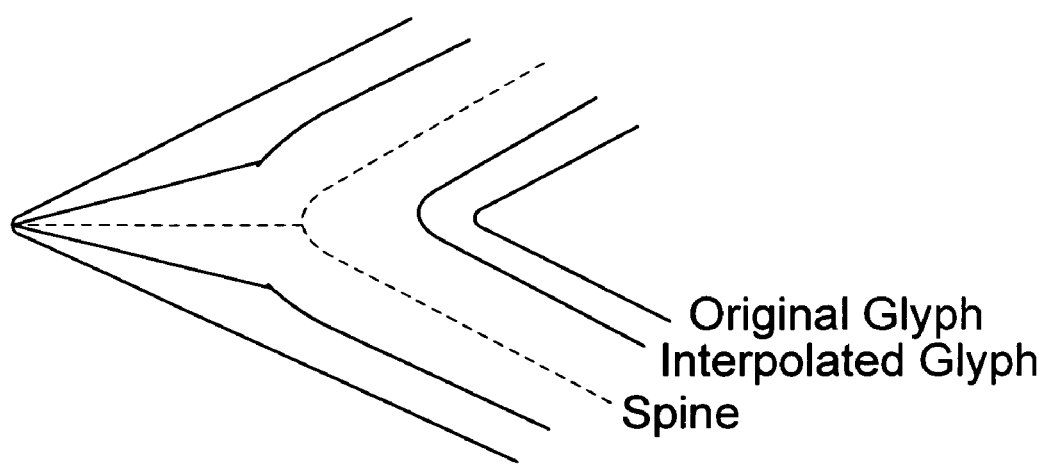
FIG. 7C shows an example of varying the direction of the perpendicular used to construct the spine and find the correspondence points continuously around a corner.
Figure 7D:
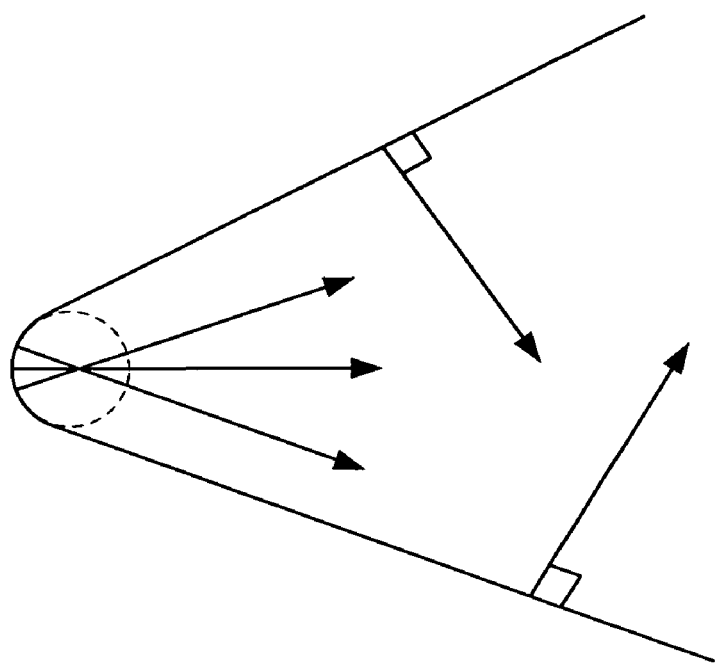
FIG. 7D illustrates replacing each corner with an infinitesimal circular arc tangent to both sides.

The approach described above can result in discontinuities in the spine at "corners" or other features that result in discontinuities in the tangent of any of the glyph curves $C_i(t)$. An example of a spine discontinuity occurring at a corner is shown in FIG. 7B. In some embodiments, piecewise discontinuities in the interpolated curve (spine) are repaired by connecting the endpoints using straight-line segments. The method can be refined to remove this problem by effectively replacing each corner with an infinitesimal circular arc tangent to both sides. In other words, the direction of the perpendicular used to construct the spine and find the correspondence points is made to vary continuously around a corner as shown in FIG. 7D. The new spine and interpolated glyph are as shown in FIG. 7C. The results are better in the example shown, but there are still some unintended embellishments: a curved inside corner and a kinked outside corner.

In some embodiments, the techniques described above to compute a spine are used to provide to a font designer a starting point to be used to define a spine for a glyph. In some embodiments, a design tool is provided to enable a font or other designer to compute a rough or approximated spine, as described above, and then refine the spine, e.g., to ensure that thickness and/or other shape adjustments made as described herein based on the spine remain as true as possible to the shape of the glyph as originally designed.

In some embodiments, a spine is computed as described above as part of a font conversion process. A font defined without spine information, e.g., in using a font definition format that does not provide for inclusion of a spine definition, is converted to a font format that supports spines and scale-adaptive behavior as described herein by computing a spine based on the original definition of the glyph outline (and/or other font information) and combining the original font definition with the computed spine to provide as output a definition of a scale-adaptive version of the original glyph, e.g., one in a format that includes a description of the glyph outline and an associated spine, as well as other information such as rules defining scale-adaptive behavior, such as defining how thickness is to be varied in accordance with overall scale.

Figure 8:
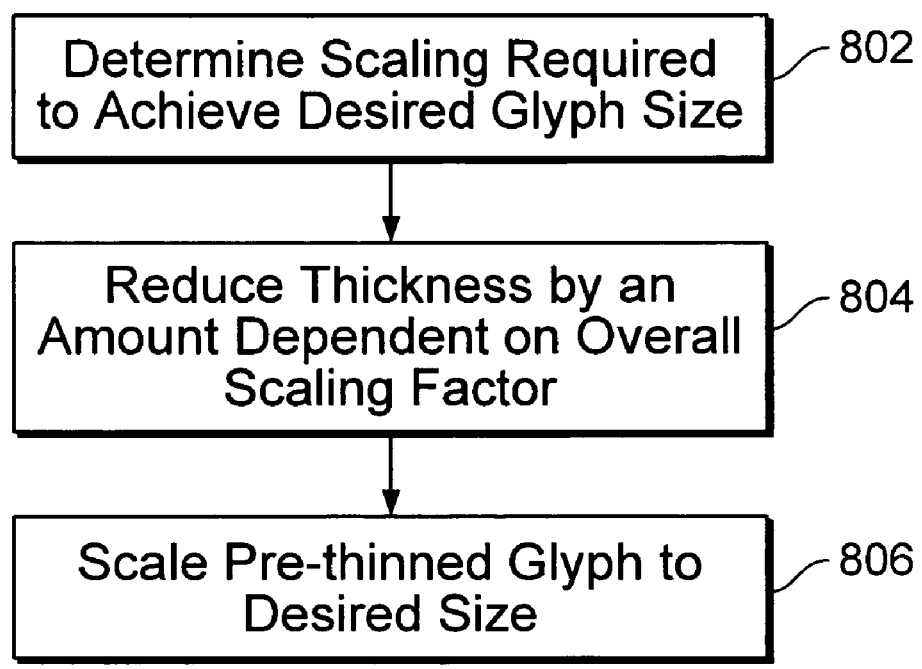
FIG. 8 is a flow chart illustrating an embodiment of a process for scaling a glyph.

FIG. 8 is a flow chart illustrating an embodiment of a process for scaling a glyph. In the example shown in FIG. 8, at 802 a scaling factor required to be applied to the overall glyph to achieve a desired glyph size is determined. At 804, the thickness (i.e., spine-to-outline distances) of the glyph are adjusted, prior to scaling, by an adjustment factor based at least in part on the scaling factor to be applied to the overall glyph. In some embodiments, 804 includes generating or modifying a vector graphic description of an outline of the glyph having the adjusted spine-to-outline distances. At 806, the pre-thinned (or thickened, in some embodiments, in the case of scaling to a smaller size) glyph is scaled to the desired overall size, e.g., by applying to the pre-thinned glyph a scaling factor determined at 802. Note that one difference between the example shown in FIG. 8 and the process of FIG. 6 is that the spine-to-outline distances are adjusted first, prior to the overall glyph and/or spine being scaled to achieve the desired overall size.

Figure 9A:
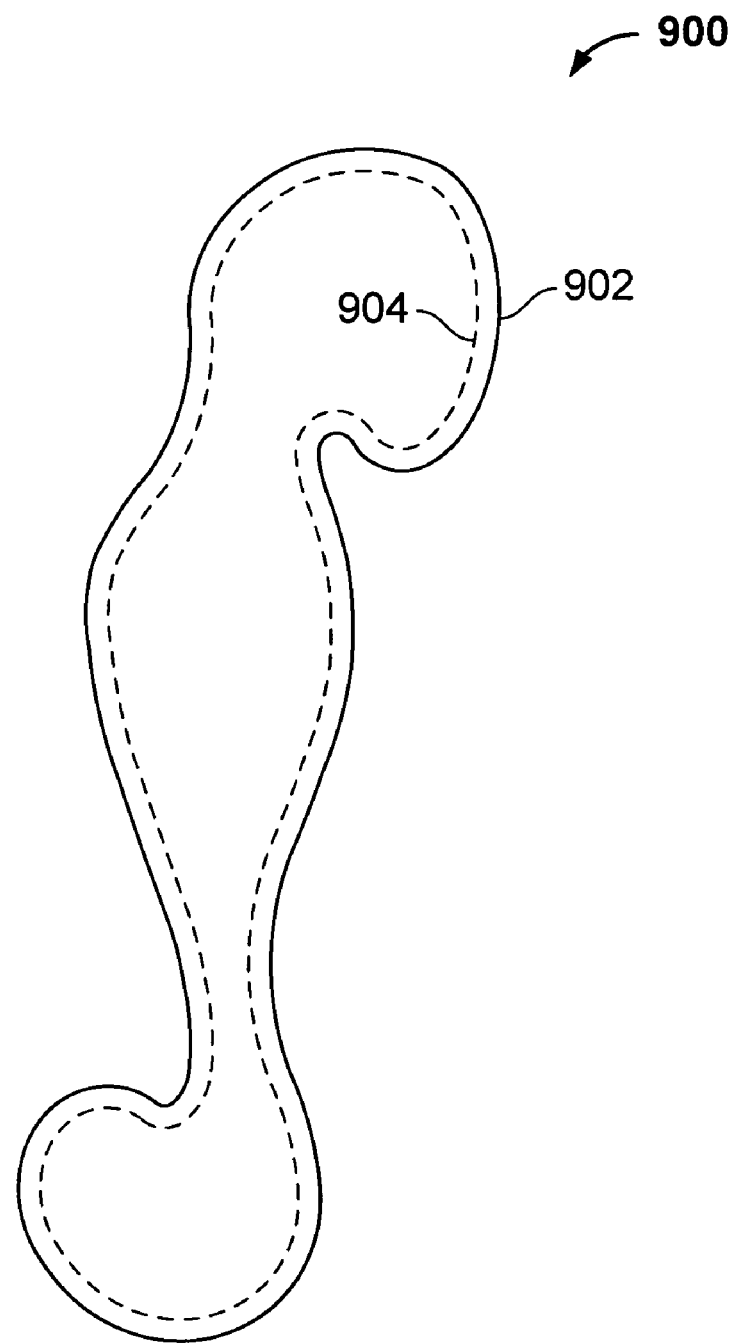
FIG. 9A is a drawing of a glyph illustrating an embodiment of an alternative process for scaling thickness not necessarily in lock step with overall glyph scale.

FIG. 9A is a drawing of a glyph illustrating an embodiment of an alternative process for scaling thickness not necessarily in lock step with overall glyph scale. In the example shown, the glyph 900 has been scaled to the size shown by applying a scaling factor "F" to the glyph at a previous and/or baseline size. The outline 902 of the initially scaled glyph is shown as being reduced or scaled back to a new outline 904 that is somewhat thinner proportionally than the originally scaled glyph. In some embodiments, the scaled back outline 904 is determined by shaving off at each point an amount proportional to the overall scaling factor F applied to the glyph to achieve the current overall size. In some embodiments, the amount pared way from the outline 902 to achieve the scaled back outline 904 is based at least in part on the scaling factor applied (or to be applied) to the overall glyph.

Figure 9B:
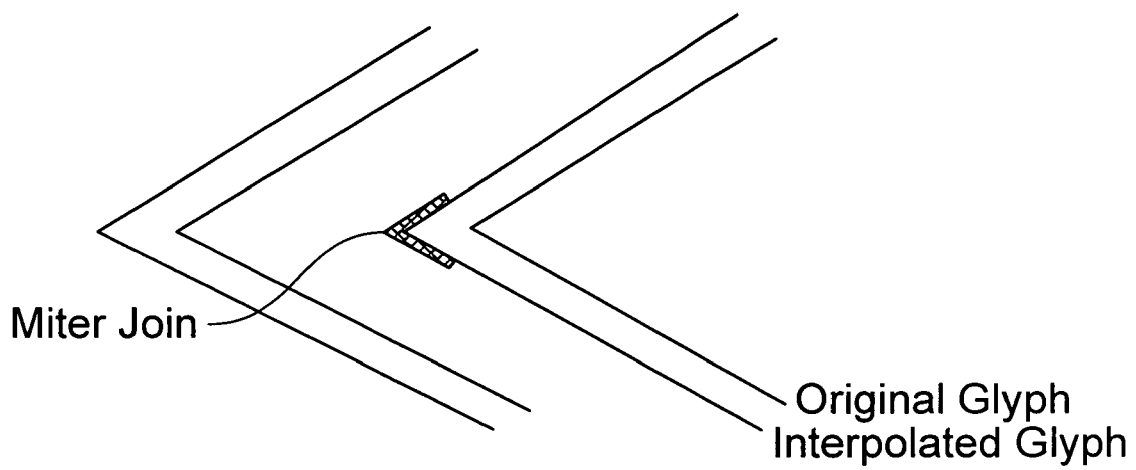
FIG. 9B shows an example of using a miter join to complete a corner.

In some embodiments, a thinning effect is created by removing the layer swept out by inward perpendiculars to the glyph, where the perpendiculars have constant length. Similarly, a thickening effect is created by adding the layer swept out by outward perpendiculars of constant length. In some embodiments, miter joins are used to complete corners, in much the same manner as they are used to draw the vertices of thick polylines in standard computer graphics packages. The results for a simple corner are as expected, as illustrated in FIG. 9B, which shows a miter join being used to complete a corner in the interpolated glyph.

Figure 9C:
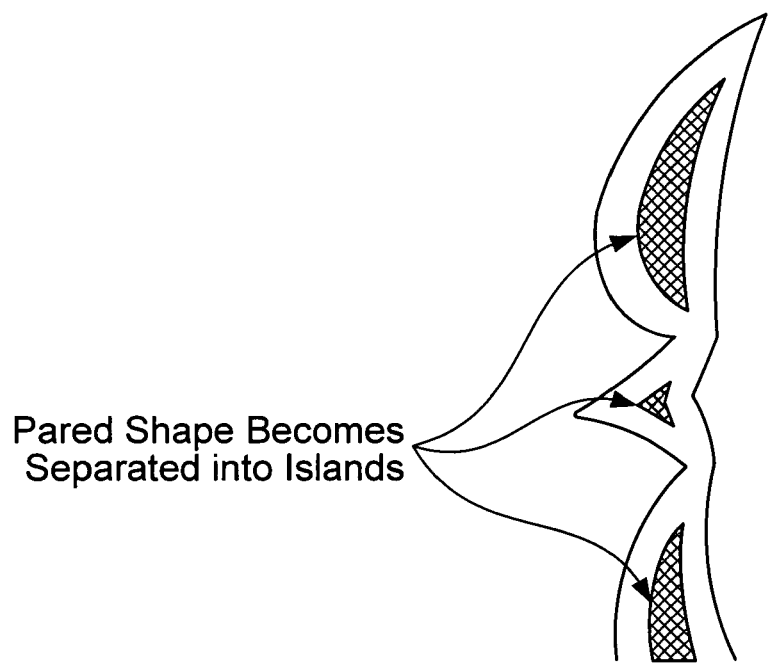
FIG. 9C shows an example of glyph thickness being reduced to zero.

One potential drawback of the approach described above in connection with FIGS. 9A and 9B is that in some cases the thickness of a glyph may be reduced to zero, as illustrating in FIG. 9C, for example, resulting in a pinching off effect and/or a discontinuity in the glyph. As FIG. 9C illustrates, there are generally strong limits on the constant amount that can be pared before thinning to zero. Likewise, there are strong limits on the thickness that can be paved onto the outside of a glyph without obliterating features such as holes in the number "8". Also, additional logic is required to handle convex corners and similar glyph features for which the approach as described above in connection with FIGS. 9A and 9B may produce inconsistent results or no defined result. However, for at least certain sets of glyphs and/or ranges of scale, the approach described in connection with FIGS. 9A and 9B yields satisfactory results, particularly for simple shapes. In some cases, however, the paring/paving technique changes the glyph topology due to too much thinning or thickening, potentially making glyphs unrecognizable.

Figure 10:
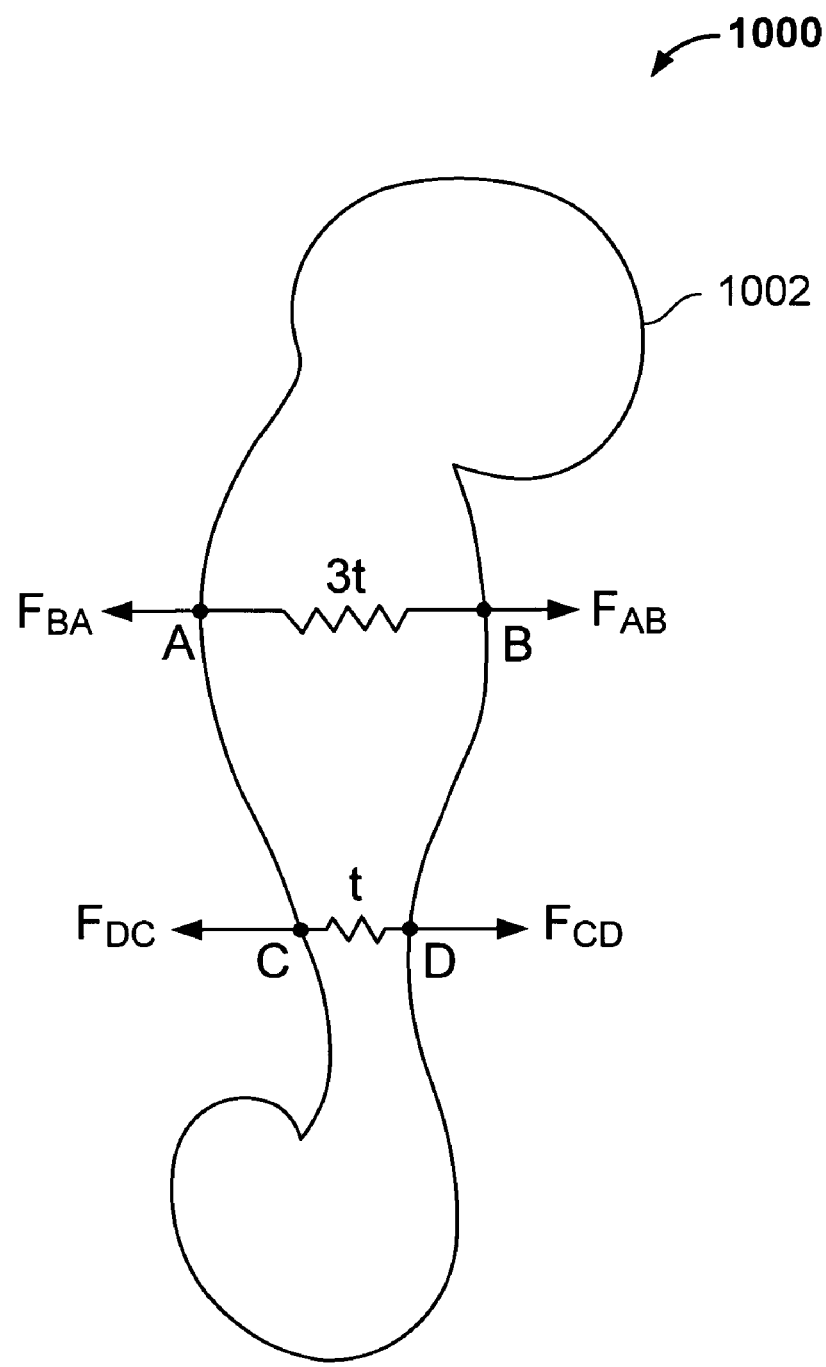
FIG. 10 is a drawing of a glyph illustrating an embodiment of an alternative process for scaling thickness not necessarily in lock step with overall glyph scale.

FIG. 10 is a drawing of a glyph illustrating an embodiment of an alternative process for scaling thickness not necessarily in lock step with overall glyph scale. In the approach illustrated in FIG. 10, each unit length of the outline 1002 of glyph 1000 is imagined to have an equal and like electrical charge, such that each unit length exerts a repulsive force on each other unit length. Under this conception, the shape of the outline 1002 of glyph 1000 can be imagined to be defined and maintained by forces applied by the imaginary springs such as those shown between points A and B (to counteract primarily the repulsive forces $F_{BA}$ and $F_{AB}$, respectively) and between points C and D (to counteract primarily the repulsive forces $F_{DC}$ and $F_{CD}$, respectively). In some embodiments, as the overall scale of the glyph 1000 is increased, the outline 1002 is scaled back at each unit length by a distance such that an equal amount of work is done to each unit length. Because the strength of the repulsive force is inversely proportional to the distance between segments on the outline 1002, the repulsive force at thicker portions, e.g., at points A and B in the example shown in FIG. 10, typically will be less than at relatively thinner points, such as points C and D. Work is equal to force times distance, so the distance by which the outline 1002 must be scaled back to achieve a given equal amount of work can be determined mathematically and typically will be greater for thicker portions of the glyph, where the distance between repelling portions is greater, than for thinner portions. The approach described above in connection with FIG. 10, therefore, typically will have the effect of causing larger and thicker features to be made less thick and therefore less prominent at larger glyph sizes. At the same time, because the potential energy approaches infinity as the distance between parallel wire segments approaches zero, under the electrostatic force approach a glyph would never even at its thinnest point be reduce to zero thickness.

Figure 11:
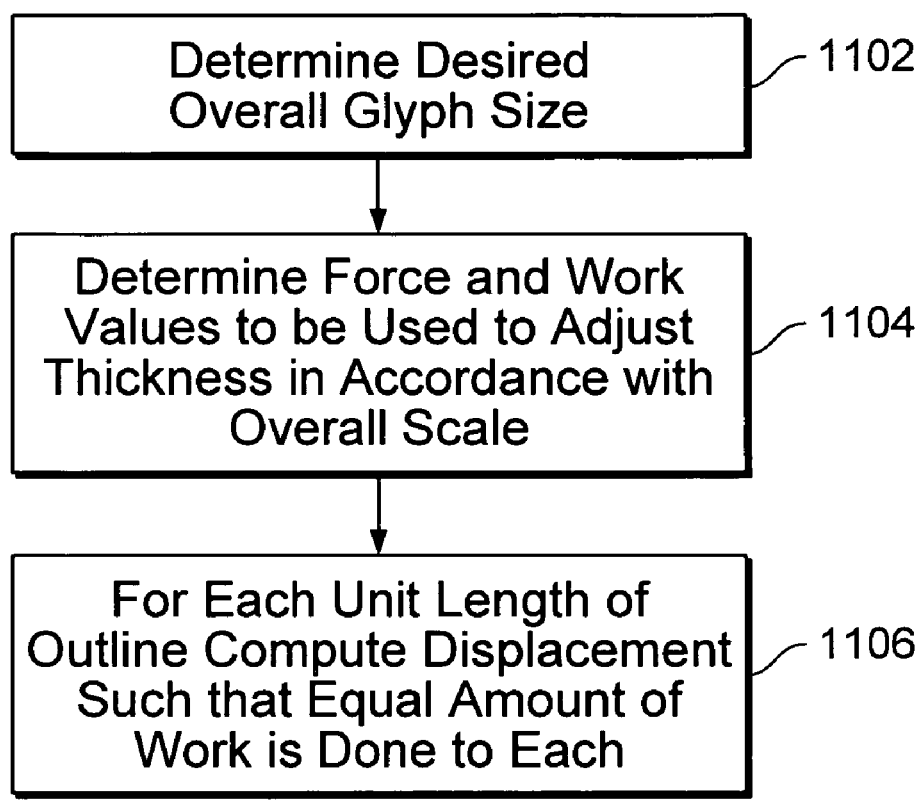
FIG. 11 is a flow chart illustrating an embodiment of a process for adaptively scaling a glyph using an electrostatic force approach.

FIG. 11 is a flow chart illustrating an embodiment of a process for adaptively scaling a glyph using an electrostatic force approach. At 1102, a desired overall glyph size is determined. At 1104, electrostatic (repulsive) force and work values to be used to adjust glyph thickness in accordance with the overall scale indicated at 1102 are determined. In some embodiments, 1104 includes determining for each unit length a total electrostatic force of repulsion applied to the unit length by other portions of the outline.

In various embodiments, the equal amount of work to be done to each unit length is preconfigured and/or determined based at least in part on a scaling factor to be applied to the overall glyph. At 1106, for each unit length of the glyph outline, a displacement of the outline, toward the interior of the glyph, such that an equal amount of work (as determined at 1104) is done to each unit length is computed. In some embodiments, the displacements computed at 1106 are implemented as described above in connection with FIG. 6 to render a scaled glyph that has been thinned as indicated by the displacements computed at 1106.

In some embodiments, the electrostatic charge technique is implemented by imagining that each glyph curve $C_i$ is an electostatically charged non-conducting wire with a constant charge $\lambda$ per unit length. The wire material is imagined to be completely flexible, but pinned in place against its own electrostatic repulsion. According to Coulomb's law, the electrostatic force per unit length at a vector position "u" on the glyph outline C can be computed as:

$$\vec{f}(\vec{u}) = k\lambda^2 \oint_C \frac{\vec{u}-\vec{v}}{\|\vec{u}-\vec{v}\|^3} ds$$

where "v" is the vector position along C, "s" is the distance along C as the integral proceeds, and "k" is a constant equal to 1 in appropriate units.

In some embodiments, a glyph is thinned by displacing each point in a direction opposite to the net electrostatic force per unit length at that point, and by a displacement distance such that a constant amount of work "w" is performed per unit length:

$$w = -\int_{\vec{u}}^{\vec{u}+\Delta\vec{u}} \vec{f}(\vec{v}) \cdot \vec{dv}$$

The computation is done by moving all points "u" in small steps "du" together, where $$\vec{du} = -\frac{dw}{\|\vec{f}(\vec{u})\|^2} \vec{f}(\vec{u})$$

and increments "dw" have to add up to "w" in the end. At each step, $\vec{f}(\vec{u})$ has to be re-computed according to the aforementioned Coulomb's Law, since all of C is perturbed with each step.

To thicken the glyph, in some embodiments constant negative work per unit is done, displacing each boundary point in the same direction as the net electrostatic force per unit length at that point.

The electrostatic force method has the advantage of causing thinner segments of the glyph to be displaced less, since the magnitude $\|\vec{du}\|$ in the above equation decreases to zero with increasing $\|\vec{f}(\vec{u})\|$ and the latter increases as charges get closer.

Specifically, in the ideal case of two parallel straight wire segments much closer than they are long, a standard application of Gauss' Law yields $$\vec{f}(\vec{u}) \approx \frac{2\lambda^2}{r}\hat{n}$$

Where r is the distance between the wires and n̂ is the outward normal at position u along one of the wires.

Bringing the wires together would require an infinite amount of work per unit length, as shown by the following equations:

$$w = \lim_{r_0 \to 0}\left(-\int_r^{r_0} \frac{2\lambda^2}{\rho} d\rho\right) =$$

$$\lim_{r_0 \to 0}[2\lambda^2\ln|\rho|]_{\rho=r_0}^{\rho=r} = \lim_{r_0 \to 0}[2\lambda^2\ln|\rho|]_{\rho=r_0}^{\rho=r} = \infty$$

Therefore finite increments of work per unit length will never bring two parallel segments together and the electrostatic force method described herein does not have the problem of pinching off that can occur with the paring method described above. While the electrostatic force method is well-behaved topologically, it cannot be tailored, e.g., by a font or other designer, in the way that the spine-based approaches described above can be tailored.

In various embodiments, one or more of the techniques described above in connection with FIGS. 3-11 are combined to achieve a provide a desired visual effect depending on the particular glyph(s), scale(s), and context.

While various of the examples described in detail above refer to fonts and glyphs comprising fonts, the techniques described herein may be applied as well to any glyph or graphic in any circumstance in which it is desirable to provide a glyph or graphic that changes thickness and/or shape, in at least some respects, depending on the overall scale.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of scaling a graphic, comprising:
receiving an indication of a desired overall size for the graphic;
scaling the graphic to the desired overall size via a processor; and
adapting a shape of the graphic to the desired overall scale at least in part by adjusting a thickness of at least a portion of the graphic in a manner that preserves one or more stylized features of the shape;
wherein adapting the shape of the graphic to the desired overall scale at least in part by adjusting a thickness of at least a portion of the graphic by an amount computed by associating with each unit length of an outline of the at least a portion of the graphic an equal and like electric charge and for each unit length determining a displacement such that an equal amount of work is done to each unit length.

2. A method as recited in claim 1, wherein:
scaling the graphic to the desired overall size includes scaling an associated spine in accordance with the desired overall size.

3. A method as recited in claim 1, wherein the graphic comprises a glyph.

4. A method as recited in claim 1, wherein the graphic comprises a font character.

5. A method as recited in claim 1, wherein the graphic comprises a vector graphic.

6. A method as recited in claim 1, further including providing for the graphic a definition that includes a description of the outline and a description of a spine.

7. A method as recited in claim 6, further including providing a mapping function that maps each point on the outline to a corresponding point on the spine.

8. A method as recited in claim 7, wherein the description of the spine and the mapping function are included in a definition of the graphic under a font encoding format that provides for such a spine description and mapping function to be included.

9. A method as recited in claim 1, further including computing a spine for the graphic.

10. A method as recited in claim 1, further including converting the graphic from a first description format that does not include a spine definition to a second description format that does include a spine definition, at least in part by computing a spine for the graphic.

11. A method as recited in claim 10, further including providing an editing tool to permit one or both of the computed spine and the mapping function to be refined.

12. A system for scaling a graphic, comprising:
a processor configured to:
receive an indication of a desired overall size for the graphic;
scale the graphic to the desired overall size; and
adapt a shape of the graphic to the desired overall scale at least in part by adjusting a thickness of at least a portion of the graphic in a manner that preserves one or more stylized features of the shape; and
a memory coupled to the processor and configured to provide instructions to the processor;
wherein the processor is configure to adapt the shape of the graphic at least inpart by adjusting a thickness of at least a portion of the graphic by an amount computed by associating with each unit length of an outline of the at least a portion of the graphic an equal and like electric charge and for each unit length determining a displacement such that an equal amount of work is done to each unit length.

13. A computer program product for scaling a graphic, the computer program product being embodied in a tangible computer readable storage medium and comprising computer instructions for:
receiving an indication of a desired overall size for the graphic;
scaling the graphic to the desired overall size; and
adapting a shape of the graphic to the desired overall scale at least in part by adjusting a thickness of at least a portion of the graphic in a manner that preserves one or more stylized features of the shape;
wherein adapting the shape of the graphic to the desired overall scale at least in part by adjusting a thickness of at least a portion of the graphic by an amount computed by associating with each unit length of an outline of the at least a portion of the graphic an equal and like electric charge and for each unit length determining a displacement such that an equal amount of work is done to each unit length.

14. A computer program product as recited in claim 13, wherein the equal amount of work is a preconfigured amount of work.

15. A computer program product as recited in claim 13, wherein the equal amount of work is determined based at least in part on a scaling factor to be applied to the overall glyph.

16. A computer program product as recited in claim 15, wherein the scaling factor is based at least in part on the desired overall size to which the glyph is being scaled.

17. A computer program product as recited in claim 13, further comprising further adjusting the shape of the graphic to achieve a desired visual effect.

18. A computer program product as recited in claim 13, wherein each unit length is displaced inward in a direction of an interior of the graphic in the event the graphic is scaled to a desired overall size that is larger than a starting size of the graphic prior to scaling.

19. A computer program product as recited in claim 13, wherein each unit length is displaced outward in a direction opposite an interior of the graphic in the event the graphic is scaled to a desired overall size that is smaller than a starting size of the graphic prior to scaling.

20. A system as recited in claim 12, wherein the equal amount of work is determined based at least in part on a scaling factor to be applied to the overall glyph.

21. A system as recited in claim 20, wherein the scaling factor is based at least in part on the desired overall size to which the glyph is being scaled.

22. A system as recited in claim 12, wherein each unit length is displaced inward in a direction of an interior of the graphic in the event the graphic is scaled to a desired overall size that is larger than a starting size of the graphic prior to scaling; and wherein each unit length is displaced outward in a direction opposite an interior of the graphic in the event the graphic is scaled to a desired overall size that is smaller than a starting size of the graphic prior to scaling.

23. A method as recited in claim 1, wherein the equal amount of work is determined based at least in part on a scaling factor to be applied to the overall glyph.

24. A method as recited in claim 23, wherein the scaling factor is based at least in part on the desired overall size to which the glyph is being scaled.

25. A method as recited in claim 1, wherein each unit length is displaced inward in a direction of an interior of the graphic in the event the graphic is scaled to a desired overall size that is larger than a starting size of the graphic prior to scaling; and wherein each unit length is displaced outward in a direction opposite an interior of the graphic in the event the graphic is scaled to a desired overall size that is smaller than a starting size of the graphic prior to scaling.

* * * * *